United States Patent
Usuda et al.

(10) Patent No.: US 7,280,835 B2
(45) Date of Patent: Oct. 9, 2007

(54) MOBILE COMMUNICATION SYSTEM AND MOBILE COMMUNICATION METHOD

(75) Inventors: Masafumi Usuda, Yokosuka (JP); Takehiro Nakamura, Yokosuka (JP)

(73) Assignee: NTT DoCoMo, Inc., Tokyo (JP)

( * ) Notice: Subject to any disclaimer, the term of this patent is extended or adjusted under 35 U.S.C. 154(b) by 29 days.

(21) Appl. No.: 11/213,887

(22) Filed: Aug. 30, 2005

(65) Prior Publication Data

US 2006/0068801 A1    Mar. 30, 2006

(30) Foreign Application Priority Data

Aug. 31, 2004   (JP)   ............ P2004-253434

(51) Int. Cl.
*H04Q 7/20* (2006.01)
(52) U.S. Cl. ............ 455/450; 455/452.2; 455/509; 455/511; 455/514; 455/422.1; 455/403; 455/67.11
(58) Field of Classification Search ......... 455/450, 455/452.2, 454, 422.1, 403, 441, 67.11, 423, 455/424, 425, 455, 64, 522, 67.13, 73, 550.1, 455/561, 575.1, 452.1, 509, 511, 514, 515, 455/445
See application file for complete search history.

(56) References Cited

U.S. PATENT DOCUMENTS

| 2003/0064729 A1* | 4/2003 | Yamashita | ............ 455/451 |
| 2004/0082311 A1 | 4/2004 | Shiu et al. | |
| 2006/0172704 A1* | 8/2006 | Nishio et al. | ............ 455/67.11 |

FOREIGN PATENT DOCUMENTS

JP        5-259969       10/1993

* cited by examiner

*Primary Examiner*—Keith Ferguson
(74) *Attorney, Agent, or Firm*—Oblon, Spivak, McClelland, Maier & Neustadt, P.C.

(57) ABSTRACT

An estimator 120 of a mobile station 100*a* of the present invention estimates traveling speed information which is a value variable with either a traveling speed of the mobile station or a variation in the traveling speed. A comparison unit 130 or a comparison unit 320 compares the traveling speed information estimated by the estimator with a threshold defined as a value of traveling speed information for achieving a desired level of communication quality which varies depending on the traveling speed. A selector 150 or a selector 340 selects an applicable frequency band in response to a result of comparison.

6 Claims, 14 Drawing Sheets

MOBILE COMMUNICATION SYSTEM AND MOBILE COMMUNICATION METHOD

CROSS REFERENCE TO RELATED APPLICATIONS

This application is based upon and claims the benefit of priority from the prior Japanese Patent Applications No. P2004-253434, filed on Aug. 31, 2004; the entire contents of which are incorporated herein by reference.

BACKGROUND OF THE INVENTION

1. Field of the Invention

The present invention relates to a mobile communication system and a mobile communication method which are configured to allow a mobile station and a radio base station to execute communication using a specific frequency band.

2. Description of the Related Art

A major change in a mobile communication system, which is accompanied by advances in technology, is called a generation change. A system before such a change and a system after the change are recognized as different generations. To achieve the generation change smoothly, different frequency bands may be allocated depending on the generations. For example, in Japan, the 800 MHz band has been mainly allocated to the second generation mobile communication system, and the 2 GHz band has been mainly allocated to the third generation mobile communication system.

Here, allocations of the frequency bands are conducted internationally by the ITU-R (which stands for International Telecommunication Union—Radio Communication Sector), and domestically by administrative agencies in each country. The 2 GHz band has been allocated internationally to the third generation mobile communication system in order to enable global standardization of radio frequency (RF) units as well as global roaming among systems adopting various modes included in the third generation mobile communication system.

If the second generation mobile system or other systems such as fixed wireless transmission were no longer in use and the number of users of the third generation mobile communication system were increased instead, the frequency bands previously allocated to the disused systems would be reallocated to the third generation mobile communication system. In such a case, the mobile communication system will be able to utilize a plurality of frequency bands.

In Japan, two frequency bands of the 800 MHz band and the 1.5 GHz band have been allocated to the second generation mobile communication system. Although only the 800 MHz band was allocated to the second generation mobile communication system in the beginning, the 1.5 GHz band was additionally allocated later with the increase in the number of users.

Conventionally, in the mobile communication system capable of utilizing a plurality of frequency bands, an applicable frequency band is selected either at random or considering the size of area coverage, radio capacity, and the like. Alternatively, since a traveling speed of a mobile station has an influence on communication quality, the applicable frequency band is also selected considering the traveling speed of the mobile station (refer to Japanese Patent Laid-Open No. H5(1993)-259969, for example).

BRIEF SUMMARY OF THE INVENTION

In the conventional technique, however, the communication quality has not been considered when selecting the applicable frequency band based on the traveling speed of the mobile station. Accordingly, it has been difficult to increase the radio capacity while reliably improving the communication quality.

Considering the foregoing problem, it is an object of the present invention to provide a mobile communication system and a mobile communication method which are capable of increasing radio capacity while improving communication quality even when a mobile station is traveling at a traveling speed that may degrade the communication quality.

To attain the object, a first aspect of the present invention provides a mobile communication system configured to allow a mobile station and a radio base station to communicate with each other using a specific frequency band. Here, the mobile communication system includes: (a) an estimator configured to estimate traveling speed information which is a value variable with a traveling speed of the mobile station or a variation in the traveling speed; (b) a comparison unit configured to compare the traveling speed information estimated by the estimator with a threshold defined as a value of traveling speed information for achieving a desired level of communication quality which varies depending on the traveling speed; and (c) a selector configured to select a frequency band to be used for communication between the mobile station and the radio base station, in response to a result of comparison by the comparison unit.

According to the mobile communication system of the first aspect, the comparison unit compares the traveling speed information estimated by the estimator with the threshold defined as the value of traveling speed information for achieving a desired level of communication quality which varies depending on the traveling speed. The selector then selects the applicable frequency band based on the result of comparison by the comparison unit. Therefore, even when the mobile station is traveling at a traveling speed which may degrade the communication quality, it is possible to increase radio capacity while improving the communication quality.

In the mobile communication system according to the first aspect, the communication quality may be defined as a degree of degradation of channel estimation accuracy, and the selector may be configured to select a lower frequency band when the traveling speed information exceeds the threshold.

Here, the channel estimation accuracy means accuracy of a channel estimation value which is an estimated value of variation in the phase and amplitude of a received signal with fading.

The channel estimation accuracy is degraded by influences of fading variation and frequency drift. The influences of fading variation and frequency drift become larger as the applicable frequency band is higher or as the traveling speed of the mobile station is faster. Therefore, the selector is configured to select the lower frequency band when the traveling speed information exceeds the threshold, whereby the selector can suppress the influences of the fading variation and the frequency drift and improve the channel estimation accuracy, even when the mobile station travels at a high traveling speed that may degrade the channel estimation accuracy.

In the mobile communication system according to the first aspect, the communication quality may be defined as a size of an interleave effect, and the selector may be configured to select a higher frequency band when the traveling speed information falls below the threshold.

Here, the interleave effect means a possibility to correct an error in a received signal due to a brief drop in signal power on a receiver side using an interleave process configured to add an error correction signal and then to rearrange the order of bits for a certain period. However, the period subject to rearrangement of the order of bits, i.e., an interleave period, has a limitation (which is usually in a range from 2 ms to 80 ms). Therefore, when the fading variation is slow, there may be a case where the signal power drops for a too long period to correct such an error.

Further, the fading variation becomes faster as the applicable frequency band is higher or as the traveling speed of the mobile station is faster. Therefore, the selector is configured to select the higher frequency band when the traveling speed information falls below the threshold, whereby the selector can suppress the influence of the fading variation and increase the interleave effect, even when the mobile station travels at a low traveling speed that may reduce the interleave effect.

In the mobile communication system according to the first aspect, the communication quality may be defined as a size of a user diversity effect of a shared channel, and the selector may be configured to select a lower frequency band when the traveling speed information exceeds the threshold.

Here, the user diversity effect means improvement of transmission efficiency in the case where a channel is shared by a plurality of users, which is achieved by allocating transmission opportunity to a user having an instantaneously better channel condition in response to channel variation of a communication signal with each user. Note that modification of an optimum transmission rate in response to the channel variation of each user is performed according to the high speed data packet access (HSDPA) adopted by the wideband code division multiple access (W-CDMA), for example (see 3GPPTS25.848 v4.0.0) However, when the fading variation becomes faster, it is not possible to follow the channel variation. Accordingly, a sufficient user diversity effect is not obtained in that case.

Further, the fading variation becomes faster as the applicable frequency band is higher or as the traveling speed of the mobile station is faster. Therefore, the selector is configured to select the lower frequency band when the traveling speed information exceeds the threshold, whereby the selector can suppress the influence of the fading variation and increase the user diversity effect even when the mobile station travels at a high traveling speed that may reduce the user diversity effect.

The mobile communication system according to the first aspect may further include (d) a detector configured to detect a radio base station capable of establishing a radio link using the frequency band selected by the selector at the time of a cell search for detecting the radio base station supposed to establish the radio link.

The mobile communication system according to the first aspect may further include (e) an allocation unit configured to allocate a channel belonging to the frequency band selected by the selector when the mobile station transmits or receives a call.

In the mobile communication system according to the first aspect, the estimator may be configured to estimate the traveling speed information using any of a channel estimation value and position information detected by a global positioning system (GPS).

The mobile communication system according to the first aspect may further include (f) a first notification unit configured to notify a radio network controller for controlling the radio base station of at least any one of the traveling speed information, the result of comparison, and the selected frequency band. Here, the estimator and the first notification unit may be installed in the radio base station.

Here, the radio network controller is a device configured to control radio communications between the radio base station and the mobile station.

The mobile communication system according to the first aspect may further include (g) a second notification unit configured to notify the radio base station of at least any one of the traveling speed information, the result of comparison, and the selected frequency band. Here, the estimator and the second notification unit may be installed in the mobile station.

A second aspect of the present invention provides a mobile communication method for executing communication between a mobile station and a radio base station using a specific frequency band. Here, the mobile communication method includes the steps of (a) estimating traveling speed information which is a value variable with a traveling speed of the mobile station or a variation in the traveling speed, (b) comparing the estimated traveling speed with a threshold defined as a value of traveling speed information for achieving a desired level of communication quality which varies depending on the traveling speed, and (c) selecting a frequency band to be used for communication between the mobile station and the radio base station in response to a result of comparison.

As described above, according to the present invention, it is possible to provide a mobile communication system and a mobile communication method which are capable of increasing radio capacity while improving communication quality even when a mobile station is traveling at a traveling speed that may degrade the communication quality.

DESCRIPTION OF THE PREFERRED EMBODIMENTS

Figure 1:
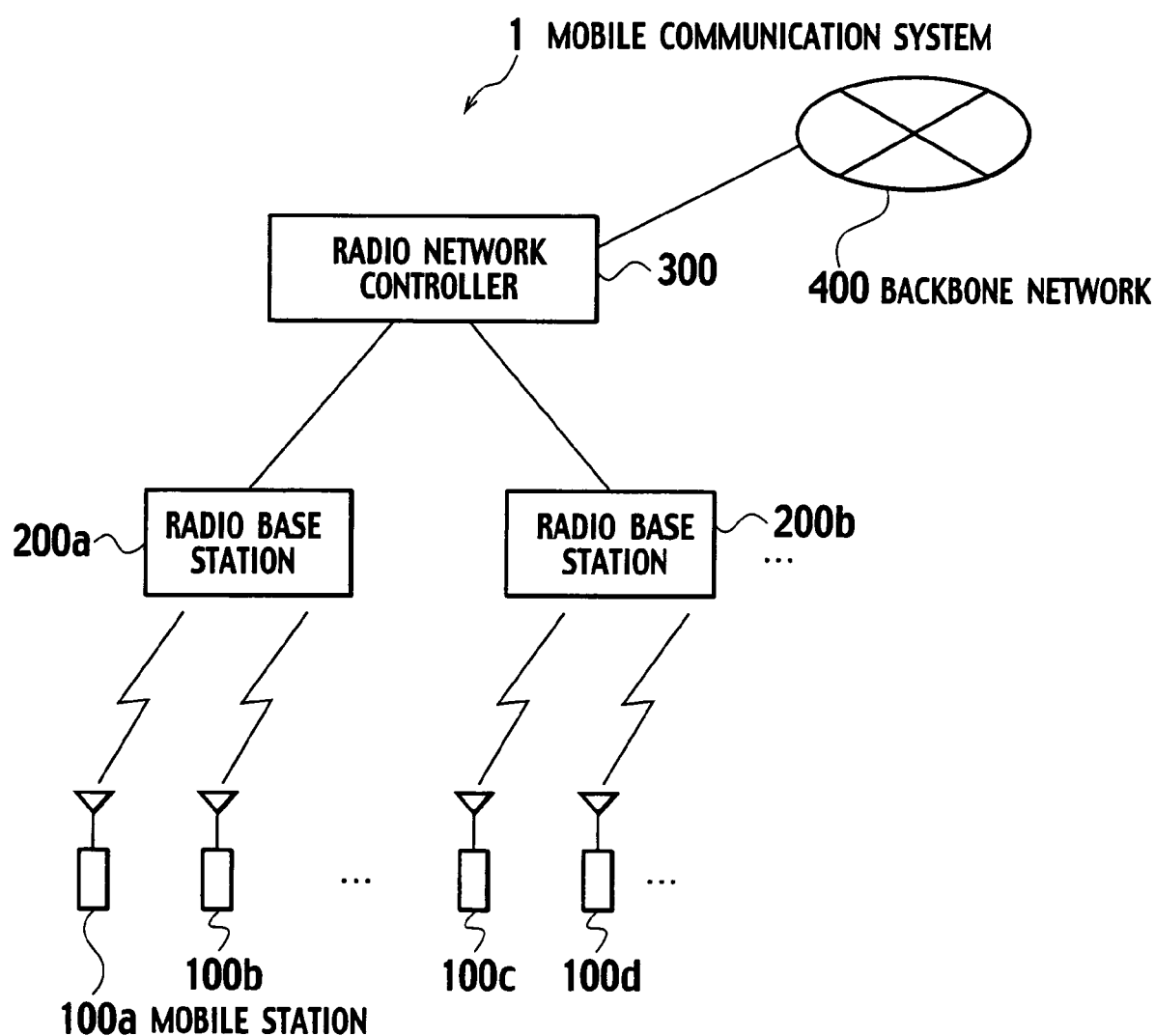
FIG. 1 is a view showing a mobile communication system according to first and second embodiments of the present invention.

Next, first and second embodiments of the present invention will be described with reference to the accompanying drawings. In the description of the drawings, the same or similar constituents are designated by the same or similar reference numerals. It is to be noted, however, that the drawings are merely schematic illustrations of the embodiments.

These embodiments describe a system applied to the W-CDMA standardized by the 3rd Generation Partnership Project (the 3GPP), which is an international standardization organization.

FIG. 1 shows a mobile communication system 1 according to the first and second embodiments of the present invention. As shown in FIG. 1, the mobile communication system 1 includes mobile stations 100a to 100d, radio base stations 200a and 200b, and a radio network controller 300. The mobile stations 100a to 100d and the radio base stations 200a and 200b establish radio links by communication using a plurality of specific frequency bands distant from each other such as the 2 GHz band and the 800 MHz band. The radio network controller 300 controls the radio base stations 200a and 200b and the radio network controller 300 is connected to a backbone network 400.

Here, the communication system applying the W-CDMA mode offers commercial services mainly using the 2 GHz band. However, this communication system is also authorized to use the 800 MHz band (see 3GPPTdoc R4-030253). Therefore, in the communication system applying the W-CDMA mode, it is also possible to offer the commercial services using a plurality of distant frequency bands, namely, the 2 GHz band and the 800 MHz band.

1. First Embodiment (Mobile Communication System)

Configurations of respective constituents of the mobile communication system 1 according to the first embodiment will be described in detail with reference to FIG. 2. The mobile station 100a includes a communication unit 110, an estimator 120, a comparison unit 130, a threshold storage unit 140, a selector 150, a notification unit 160, and a detector 170.

The communication unit 110 transmits and receives signals to and from a communication unit 210 installed in the radio base station 200a through a radio link established between the radio base station 200a and the communication unit 110.

The estimator 120 estimates traveling speed information, which is a value variable either with a traveling speed or with an increase and a decrease in the traveling speed. An example method of estimating the traveling speed information will be described below. Here, an inverse number of a time correlation value of a channel estimation value will be used as the traveling speed information.

The channel estimation value is an estimated value for estimating variation in the phase and amplitude of a received signal due to fading variation. The estimator 120 can calculate the channel estimation value using a pilot signal acquired through the communication unit 110. Here, the pilot signal means an individual pilot of an uplink, and a common pilot of a down link.

A time correlation value Corr(τ) of the channel estimation value can be calculated as described below using a channel estimation value C(t), for example:

$$Corr(\tau) = \frac{|C(t) \cdot C^*(t-\tau)|}{|C(t)|^2} \quad (1)$$

Specifically, the time correlation value is a correlation value between the channel estimation value C(t) at time t and a channel estimation value C(t-τ) at predetermined time t earlier than the time t. Here, τ in the formula (1) will be referred to as delay time.

Figure 3:
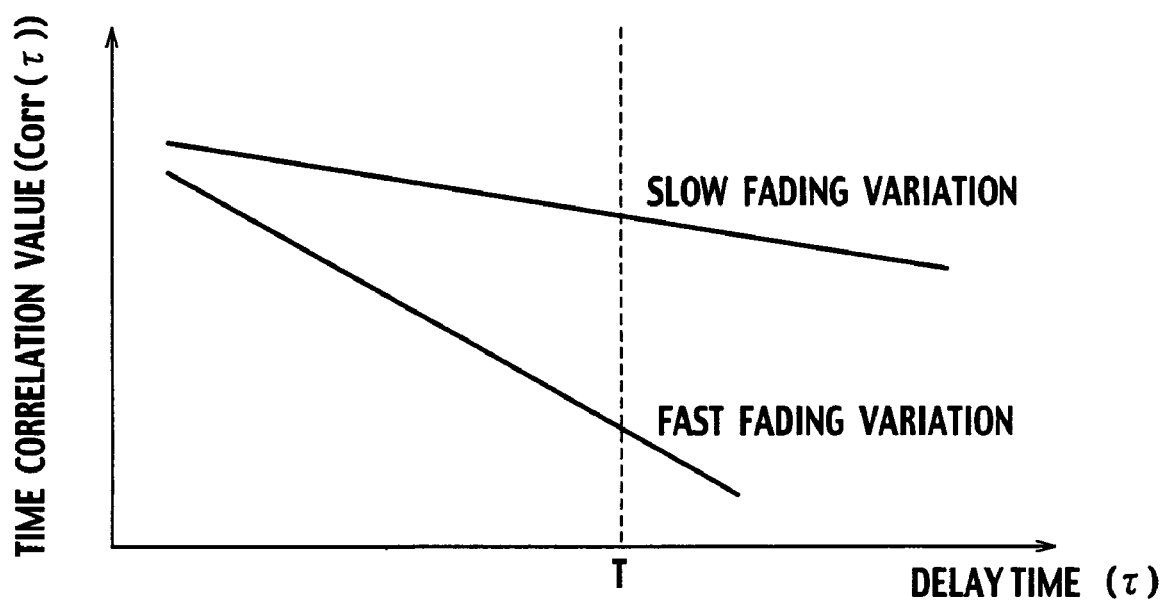
FIG. 3 is a graph showing a relation between a time correlation value and delay time.

FIG. 3 shows a relation between the time correlation value and the delay time. As shown in FIG. 3, since the channel estimation value varies due to the fading nw influence, the time correlation value becomes smaller as the delay time is longer. Moreover, a decrease in the time correlation value owing to an increase in the delay time becomes steeper as the fading variation is faster. Therefore, it is possible to determine that the fading variation is slow when a time correlation value Corr(T) at appropriate time T is large, and that the fading variation is fast when Corr (T) is small. Here, T means an average time width when averaging a received signal.

In addition, the fading variation becomes faster as the traveling speed of the mobile station is faster. Accordingly, it is possible to determine that the traveling speed is slow when Corr (T) is large, and that the traveling speed is fast when Corr(T) is small. That is, an inverse number {Corr(T)}−1 of the time correlation value at the delay time T becomes larger when the traveling speed is faster or becomes smaller when the traveling speed is slower. Thus, the inverse number of the time correlation value is the value increased or decreased according to an increase or decrease in the traveling speed of the mobile station, and thereby constituting traveling speed information.

Therefore, the estimator 120 can calculate the channel estimation value using the pilot signal, and estimate the traveling speed in formation by calculating the following formula (2):

$$\{Corr(T)\}^{-1} = \frac{|C(t)|^2}{|C(t) \cdot C^*(t-T)|} \quad (2)$$

Here, the method of estimating the traveling speed information is not limited only to the above-described method using the received signal (a downlink signal) received by the mobile communication system. For example, it is also possible to estimate the traveling speed information by acquiring position information from the GPS and calculating a proportion of a change in the position at an appropriate time interval.

The comparison unit 130 acquires the traveling speed information estimated by the estimator 120 from the estimator 120, and compares the traveling speed information estimated by the estimator 120 with a threshold which is stored in the threshold storage unit 140 to be described later.

Here, the threshold means a value of the traveling speed information for achieving a desired level of communication quality which varies with the traveling speed. The communication quality is given quality which varies with the traveling speed which, for instance, includes a degree of degradation of channel estimation accuracy, a size of an interleave effect, a size of a user diversity effect, and the like. The value of the traveling speed information achieving the desired level of the communication quality is determined according to aspects of the variation in the communication quality relative to the variation in the traveling speed information. Here, the aspects of the communication quality relative to the variation in the traveling speed information are obtained either by experiments or by simulations.

Figure 4A:
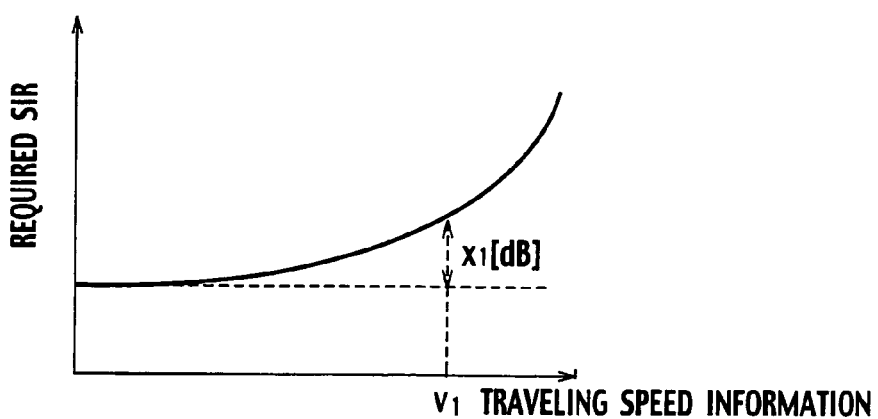
FIGS. 4A to 4D are graphs showing variations in communication quality relative to variations in traveling speed information.

In the W-CDMA, coherent detection is performed using the channel estimation value which is estimated by channel estimation using the pilot signal. Therefore, a performance of RAKE reception is deteriorated when the channel estimation accuracy is degraded by fading, whereby a signal to interference ratio (SIR) for setting a block error rate (BLER) to a target value is increased, for example. FIG. 4A shows a required SIR (a signal to interference ratio of electric power required for setting the BLER to the target value) relative to the traveling speed information. As shown in FIG. 4A, it is possible to define traveling speed information v1 rendering the required SIR equal to x1 as the threshold, for example.

Figure 4B:
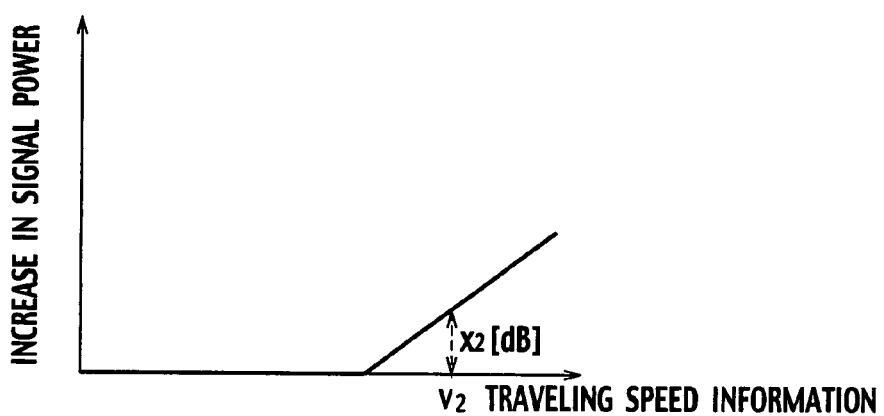

Meanwhile, as shown in FIG. 4B, signal power is increased as the channel estimation accuracy is degraded due to an influence of a frequency drift. Therefore, it is possible to define traveling speed information v2 rendering the increased signal power equal to x2 as the threshold.

Figure 4C:
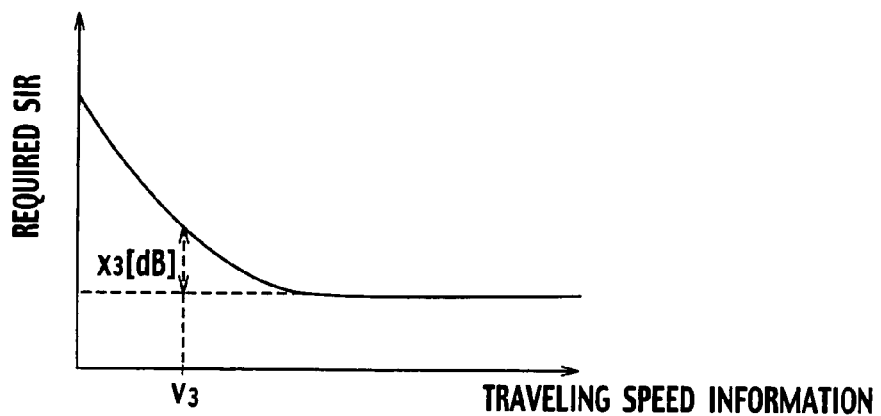

Moreover, when the interleave effect is reduced, the target SIR (a required SIR) to achieve a frame error rate (FER) is increased, for example. As shown in FIG. 4C, it is possible to define traveling speed information v3 rendering a required SIR (a signal to interference ratio of electric power required for setting the FER to the target value) equal to x3 as the threshold.

Figure 4D:
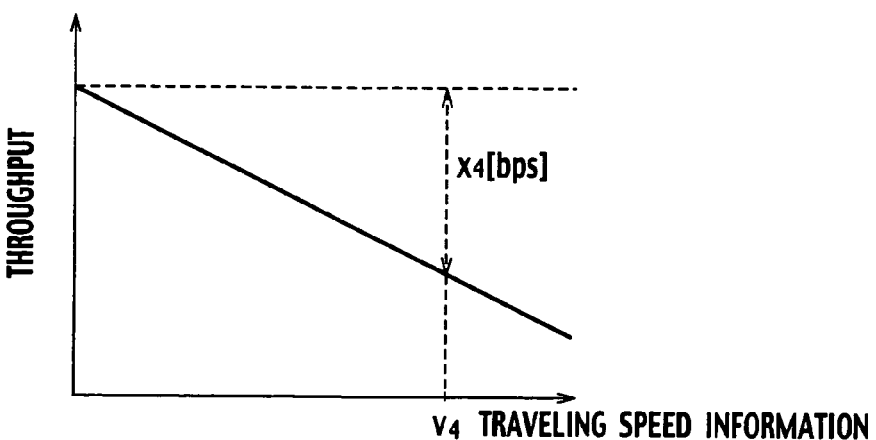

Further, in order to define the threshold considering improvement in throughput which represents one of factors of the user diversity effect, it is possible to set traveling speed information v4 rendering the throughput equal to x4 as the threshold using a relation between the traveling speed information and the throughput as shown in FIG. 4D.

As described above, the threshold storage unit 140 stores the threshold which is determined in response to the communication quality to be considered.

The selector 150 selects a frequency band to be used for communication between the mobile station 100a and the radio base station 200a, in response to an acquired result of comparison. Here, the selector 150 acquires the result of comparison between the threshold and the traveling speed information, from the comparison unit 130.

When the communication quality falls below the desired level, the selector 150 selects an appropriate frequency band in order to increase the communication quality. For example, in the case where the communication quality is equivalent to the channel estimation accuracy or the size of the user diversity effect, the communication quality falls below the desired level because the traveling speed information exceeds the threshold. Therefore, the selector 150 selects a lower frequency band when the traveling speed information exceeds the threshold. On the contrary, in the case where the communication quality is equivalent to the size of the interleave effect, the communication quality falls below the desired level when the traveling speed information falls below the threshold. Therefore, the selector 150 selects a higher frequency band when the traveling speed information falls below the threshold.

The notification unit 160 is a second notification unit configured to notify the radio network controller 300, through the communication unit 110 and the radio base station 200a, of any one of the traveling speed information estimated by the estimator 120, the result of comparison by the comparison unit 130, and the frequency band selected by the selector 150. Here, the notification unit 160 acquires: the traveling speed information from the estimator 120 through the comparison unit 130 and the selector 150; the result of comparison from the comparison unit 130 through the selector 150, and the selected frequency band from the selector 150.

The detector 170 detects the radio base station 200a or 200b which can establish the radio link in the frequency band selected by the selector 150 at the time of a cell search for detecting the radio base station 200a or 200b, which is supposed to establish the radio link.

Here, the cell search is performed in any of an event to turn on the power of the mobile station 100a, an event prior to setting the mobile station 100a to a soft handover mode and an event in a standby state of the mobile station 100a. Further, when it is possible to specify the radio base station capable of establishing the radio link as a result of the cell search, the mobile station 100a acquires a paging channel for notifying existence of an incoming call or an information channel for receiving information concerning various parameters of the mobile communication system, neighboring cells, and the like either periodically or upon occurrence of an event.

Figure 2:
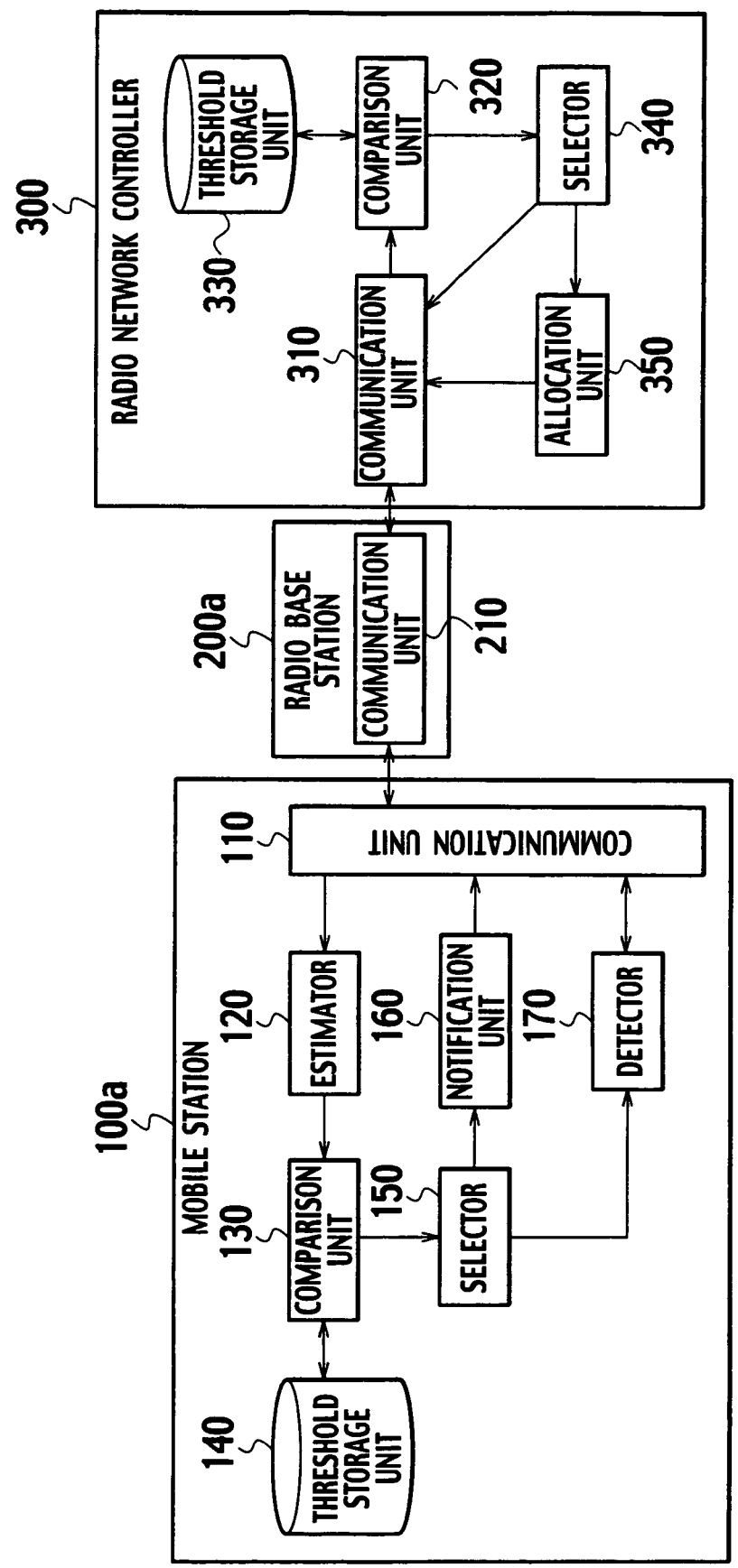
FIG. 2 is a block diagram showing configurations of respective constituents of the mobile communication system according to the first embodiment.

As shown in FIG. 2, the radio base station 200a includes the communication unit 210. The communication unit 210 transmits and receives signal to and from the communication unit 110 installed in the mobile station 10a and a communication unit 310 installed in the radio network controller 300.

The radio network controller 300 includes the communication unit 310, a comparison unit 320, a threshold storage unit 330, a selector 340, and an allocation unit 350.

The communication unit 310 transmits and receives signals to and from the communication unit 210 installed in the radio base station 200a.

The comparison unit 320 compares the traveling speed information with a threshold stored in the threshold storage unit 330 as similar to the comparison unit 130. However, the comparison unit 320 acquires the traveling speed information from the notification unit 160 through the communication unit 310, the communication unit 210 of the radio base station 200a, and the communication unit 110 of the mobile station 100a.

The threshold storage unit 330 stores the threshold obtained in response to the communication quality to be considered as similar to the threshold storage unit 140.

As similar to the selector 150, the selector 340 selects the frequency band used for communication between the mobile station 100a and the radio base station 200a in response to an acquired result of comparison. Here, the selector 340 acquires the result of comparison between the threshold and the traveling speed information from the comparison unit 320.

The allocation unit 350 allocates a channel belonging to the frequency band selected either by the selector 150 or by the selector 340 when the mobile station 100a transmits or receives a call.

Here, the comparison unit, the threshold storage unit, and the selector may be installed in either the mobile station 100a or the radio network controller 300. For example, when the comparison unit, the threshold storage unit, and the selector are installed only in the mobile station 100a, the notification unit 160 notifies the radio network control unit 300 of the frequency band selected by the selector 150. Alternatively, when the comparison unit and the threshold storage unit are installed only in the mobile station 100a while the selector is installed only in the radio network controller 300, the notification unit 160 notifies the radio network controller 300 of the result of comparison by the comparison unit 130.

(Mobile Communication Method)

Next, a mobile communication method according to the first embodiment will be described with reference to FIG. 5 to FIG. 15.

Figure 5:
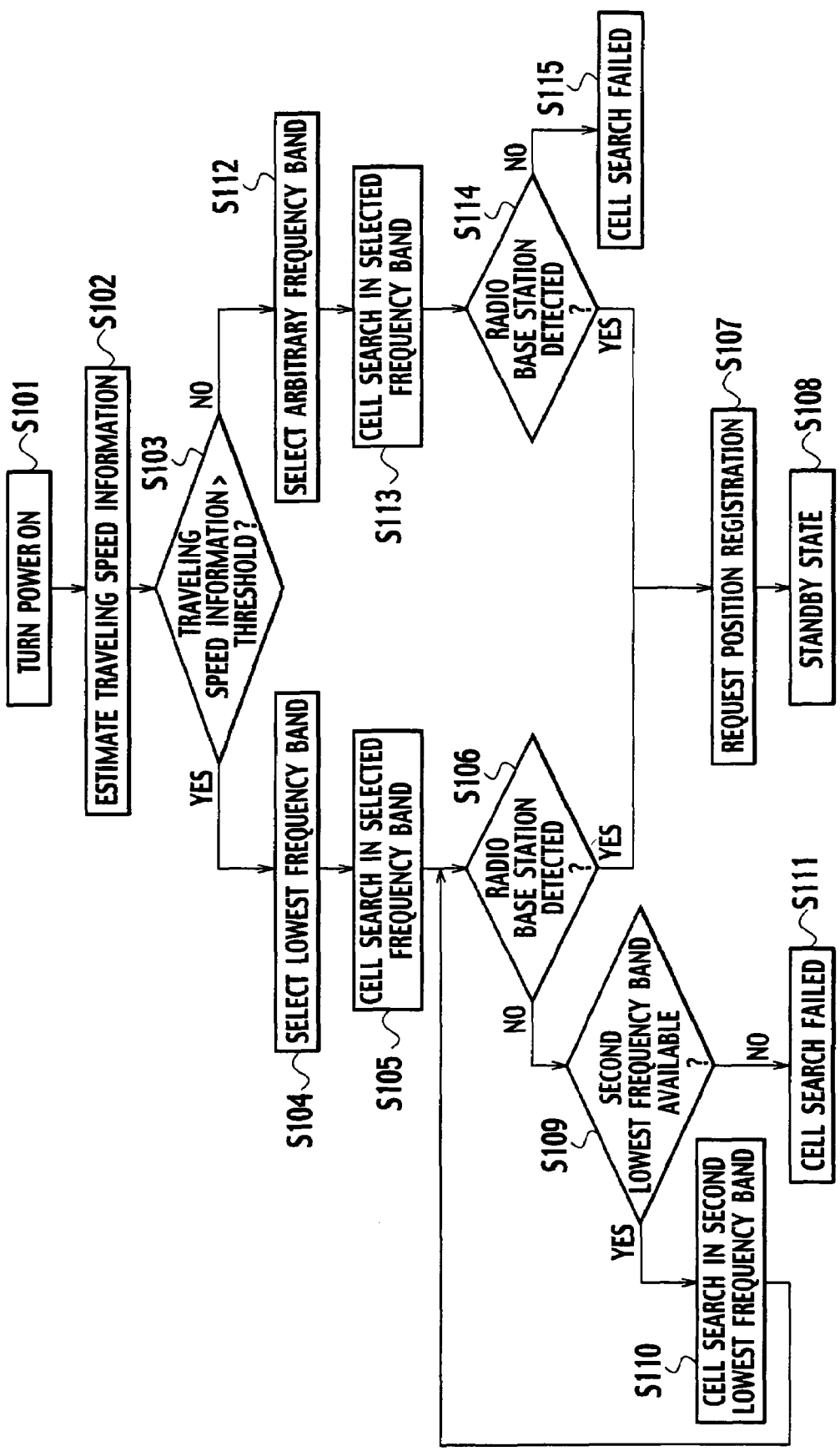
FIG. 5 is a flowchart showing a method of performing a cell search when a mobile station is turned on (No. 1).

FIG. 5 is a flowchart showing a method of performing the cell search when the mobile station 100a is turned on. Here, the communication quality is assumed to be the communication quality such as the degree of degradation of the channel estimation accuracy, which deteriorates as the traveling speed of the mobile station becomes faster.

In Step S101, the power of the mobile station 100a is turned on.

In Step S102, the estimator 120 estimates the traveling speed information.

In Step S103, the comparison unit 130 compares the traveling speed information with the threshold. When the traveling speed information exceeds the threshold, the processing in Step S104 is performed.

In Step S104, the selector 150 selects the lowest selectable frequency band.

In Step S105, the detector 170 performs the cell search for detecting the radio base station which can establish the radio link in the selected frequency band.

In Step S106, the detector 170 judges whether or not the appropriate radio base station is detected.

When the judgment is made in Step S106 that the appropriate radio base station is detected, in Step S107, the detector 170 issues a position registration request to the detected radio base station and establishes the radio link.

In Step S108, the mobile station is set to the standby state to receive paging from the radio base station.

When the judgment is made in Step S106 that the appropriate radio base station is not detected, in Step S109, the detector 170 judges whether or not there is the second lowest frequency band.

When the judgment is made in Step S109 that the second lowest frequency band is available, the detector 170 performs the cell search using the frequency band in Step S110. Thereafter, the processing from Steps S106 to S111 is performed.

When the judgment is made in Step S109 the second lowest frequency band is not available, the detector 170 determines a failure of the cell search in Step S111.

On the contrary, when the judgment is made in Step S103 that the traveling speed information does not exceed the threshold, the selector 150 selects an arbitrary frequency band in Step S112.

In Step S113, the detector 170 performs the cell search in the selected frequency band.

In Step S114, the detector 170 judges whether or not the appropriate radio base station is detected.

When the judgment is made in Step S114 that the appropriate radio base station is not detected, the detector 170 determines a failure of the cell search in Step S115.

Figure 6:
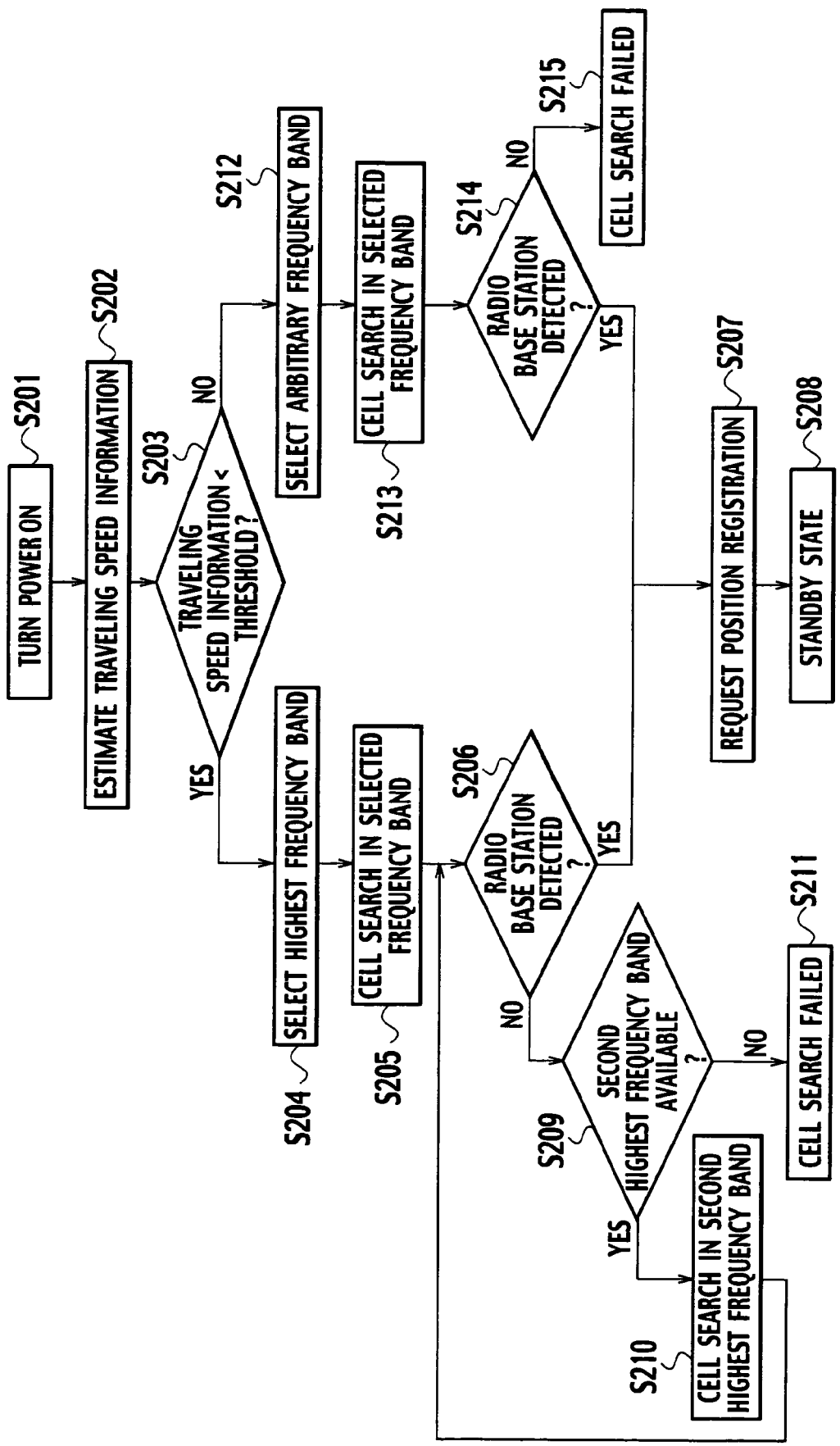
FIG. 6 is a flowchart showing the method of performing the cell search when the mobile station is turned on (No. 2).

FIG. 6 is a flowchart showing the method of performing the cell search when the mobile station 10a is turned on as similar to FIG. 5. However, in this case, the communication quality is assumed to be the communication quality such as the size of the interleave effect, which is deteriorated as the traveling speed of the mobile station becomes slower. In the following, the steps of performing different processing from those in FIG. 5 will be described.

In Step S203, the comparison unit 130 compares the traveling speed information with the threshold. When the traveling speed information falls below the threshold, the processing in Step S204 is performed.

Meanwhile, when the judgment is made in Step S206 that the appropriate radio base station is not detected, a judgment is made in Step S209 as to whether or not the second highest frequency band is available.

When the judgment is made in Step S209 that the second highest frequency band is available, in Step S210, the detector 170 performs the cell search using the frequency band.

Figure 7:
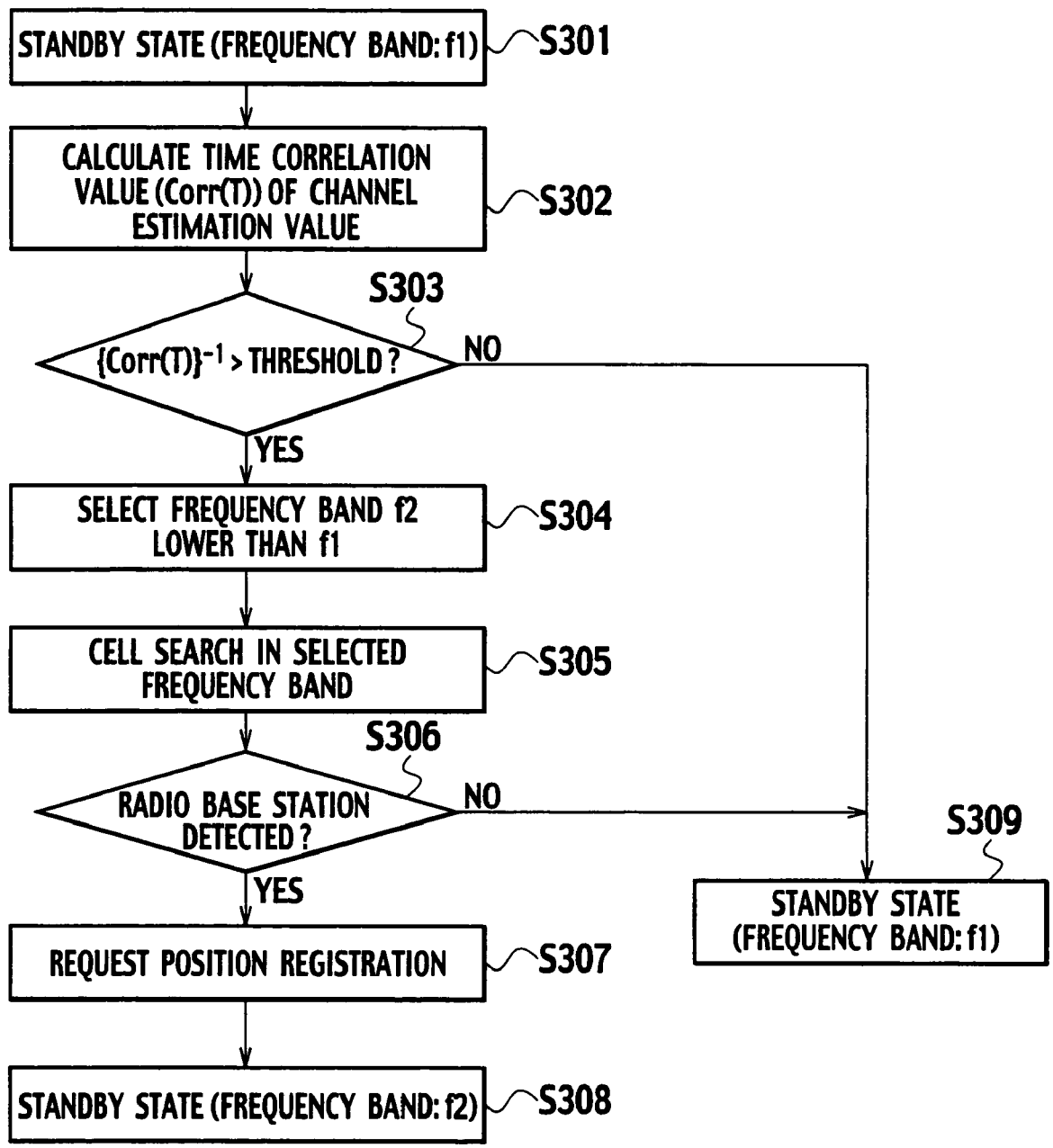
FIG. 7 is a flowchart showing the method of performing the cell search when the mobile station is in a standby state (No. 1).

FIG. 7 is a flowchart showing the method of performing the cell search when the mobile station 100a is in a standby state. Here, the communication quality is assumed to be the communication quality such as the degree of degradation of the channel estimation accuracy, which is deteriorated as the traveling speed of the mobile station becomes faster.

In Step S301, the mobile station 100a is in the standby state for receiving the paging from the radio base station using a channel belonging to a frequency band f1. In the standby state, the mobile station 100a receives only one frame in about every one to two seconds, for example, in order to save a battery of the mobile station and to acquire different neighboring cells. The mobile station performs the following processing in the remaining time.

In Step S302, the estimator 120 estimates the traveling speed information by calculating the time correlation value Corr(T) of the channel estimation value using the pilot signal.

In Step S303, the comparison unit 130 compares the inverse number of the time correlation value with the threshold, and thereby judges whether or not the inverse number of the time correlation value exceeds the threshold.

When the judgment is made in Step S303 that the inverse number of the time correlation value exceeds the threshold, in Step S304, the selector 150 selects a frequency band f2 that is lower than the frequency band f1.

In Step S305, the detector 170 performs the cell search using the selected frequency band f2.

In Step S306, the detector 170 judges whether or not the radio base station supposed to establish the radio link is detected.

When the judgment is made in Step S306 that the radio base station supposed to establish the radio link is detected, the detector 170 issues the position registration request to the relevant radio base station 200a and establishes the radio link in Step S307.

In Step S308, the mobile station is set to the standby state for receiving the paging from the radio base station using a channel belonging to the frequency band f2.

When the judgment is made in Step S303 that the inverse number of the time correlation value does not exceed the threshold or when the judgment is made in Step S306 that the radio base station is not detected in the selected frequency band, the mobile station 100a is set to the standby state for receiving the paging from the radio base station on the channel belonging to the frequency band f1.

Figure 8:
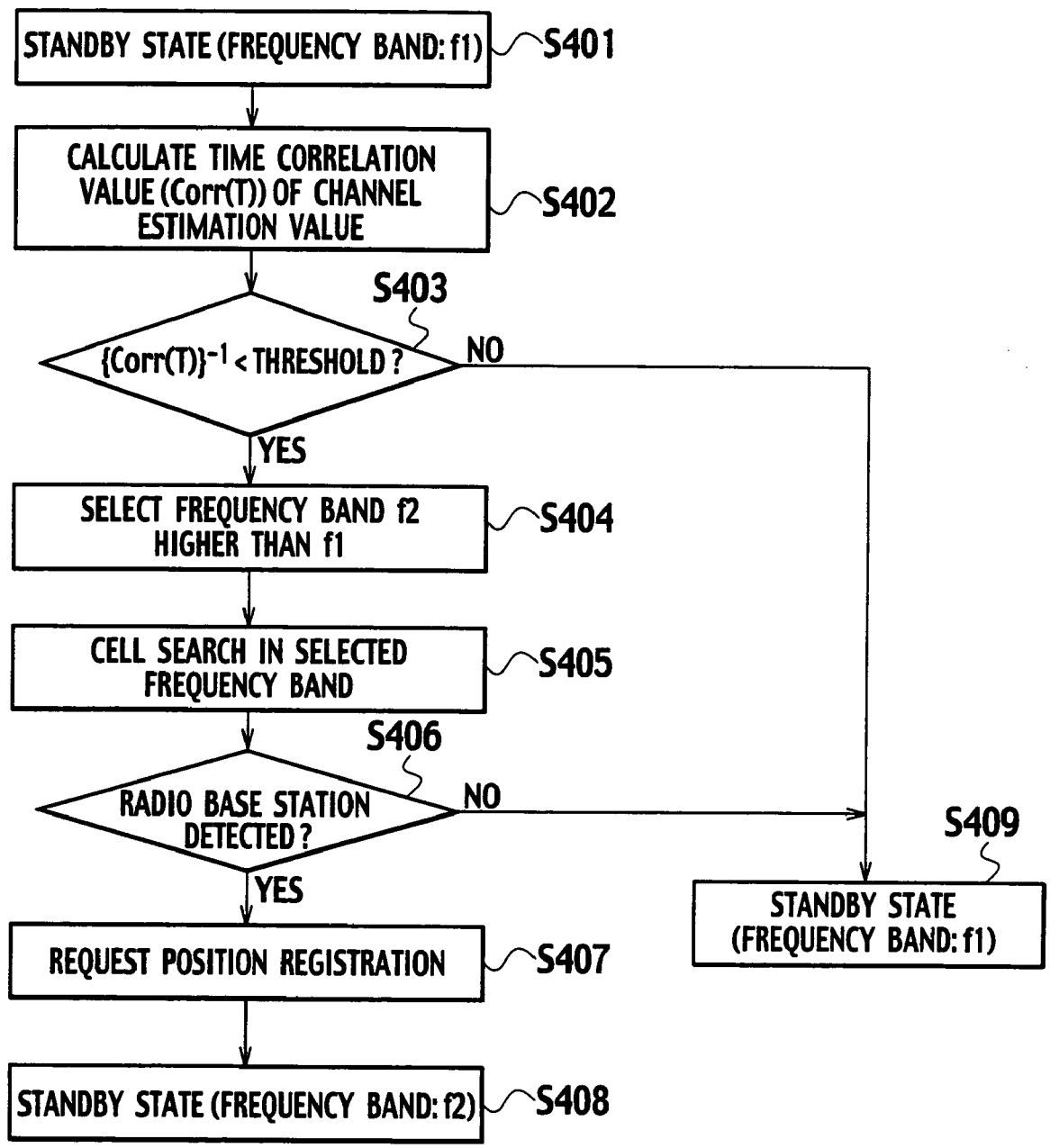
FIG. 8 is a flowchart showing the method of performing the cell search when the mobile station is in the standby state (No. 2).

FIG. 8 is a flowchart showing the method of performing the cell search when the mobile station 10a is in the standby state as similar to FIG. 7. However, in this case, the communication quality is assumed to be the communication quality such as the size of the interleave effect, which is deteriorated as the traveling speed of the mobile station becomes slower. In the following, the step of performing different processing from that in FIG. 7 will be described.

In Step S403, the comparison unit 130 compares the traveling speed information with the threshold. When the traveling speed information falls below the threshold, in Step S404, the selector 150 selects a frequency band f2 that is higher than the frequency band f1.

Figure 9:
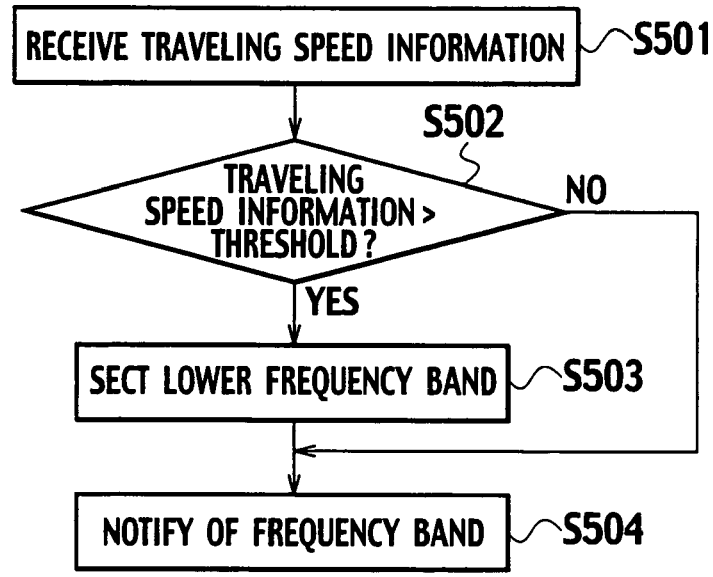
FIG. 9 is a flowchart showing a method of allowing a radio network controller to select a frequency band through which the mobile station receives paging in the standby state (No. 1).

FIG. 9 is a flowchart showing a method of allowing the radio network controller 300 to select a frequency band through which the mobile station 10a receives the paging in the standby state. Here, the communication quality is assumed to be the communication quality such as the degree of degradation of the channel estimation accuracy, which is deteriorated as the traveling speed of the mobile station becomes faster.

In Step S501, the communication unit 310 receives the traveling speed information from the mobile station 100a. The traveling speed information is included in a control signal which is transmitted from the mobile station 100a to the radio network controller 300, for example.

In Step S502, the comparison unit 320 compares the acquired traveling speed information with the threshold.

When the judgment is made in Step S502 that the traveling speed information exceeds the threshold, in Step S503, the selector 340 selects a frequency band lower than the frequency band currently in use.

In Step S504, the communication unit 310 notifies the mobile station 100a of the selected frequency band.

Here, when the comparison unit 320 judges that the traveling speed information does not exceed the threshold in Step S502, in Step 504, the communication unit 310 notifies the mobile station 100a of the original frequency band.

Figure 10:
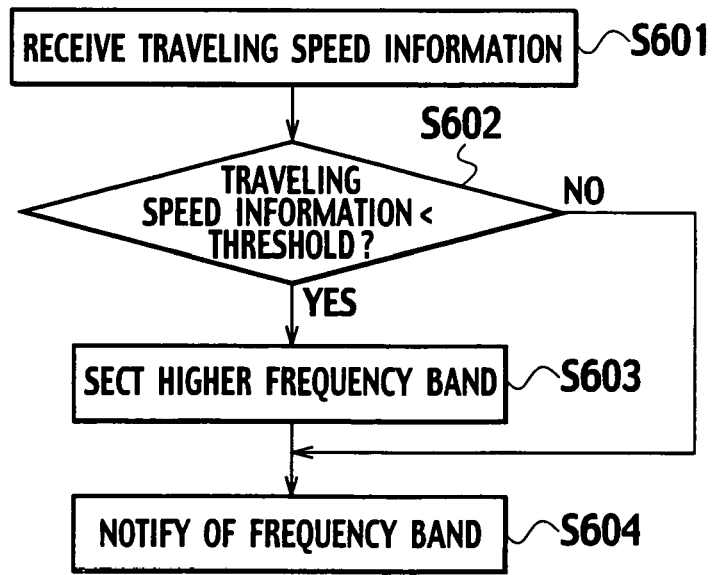
FIG. 10 is a flowchart showing the method of allowing the radio network controller to select the frequency band through which the mobile station receives the paging in the standby state (No. 2).

FIG. 10 is a flowchart showing the method of allowing the radio network controller 300 to select the frequency band through which the mobile station 10a receives the paging in the standby state as similar to FIG. 9. However, in this case, the communication quality is assumed to be the communication quality such as the size of the interleave effect, which is deteriorated as the traveling speed of the mobile station becomes slower. In the following, the step of performing different processing from that in FIG. 9 will be described.

When the judgment is made in Step S602 that the traveling speed information falls below the threshold, in Step S603, the selector 340 selects a frequency band higher than the frequency band currently in use.

Figure 11:
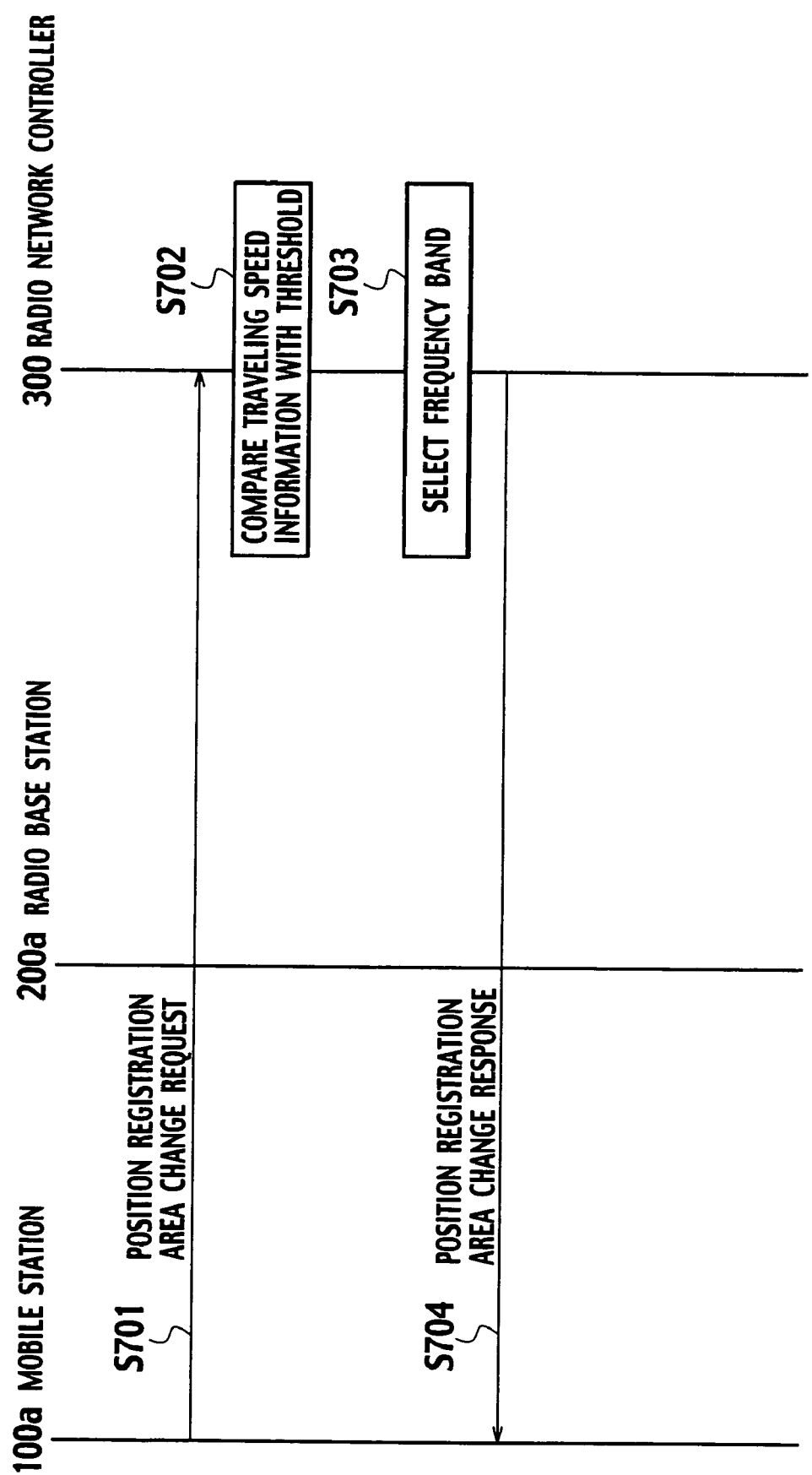
FIG. 11 is a sequence chart showing the method of allowing the radio network controller to select the frequency band through which the mobile station receives the paging in the standby state.

FIG. 11 is a sequence chart showing the method of allowing the radio network controller 300 to select the frequency band through which the mobile station 100a receives the paging in the standby state. In the following, transmission and reception of signals between the mobile station 100a and the radio network controller 300 are relayed by the communication unit 210 of the radio base station 200a.

In Step S701, the communication unit 110 of the mobile station 100a transmits a position registration area change request to the radio network controller 300, and the communication unit 310 of the radio network controller 300 receives the position registration area change request. The position registration area change request includes the traveling speed information.

In Step S702, the comparison unit 320 compares the traveling speed information included in the received position registration area change request with the threshold.

In Step S703, the selector 340 selects the applicable frequency band in response to a result of comparison in Step S702.

In Step S704, the communication unit 310 transmits a position registration area change response to the communication unit 110 of the mobile station 100a. The position registration area change response includes the selected frequency band.

Incidentally, the position registration area change request transmitted and received in Step S701 is an example of control signals. The mobile station 100a can transmit various control signals to the radio network controller 300 while enclosing the traveling speed information therein.

Figure 12:
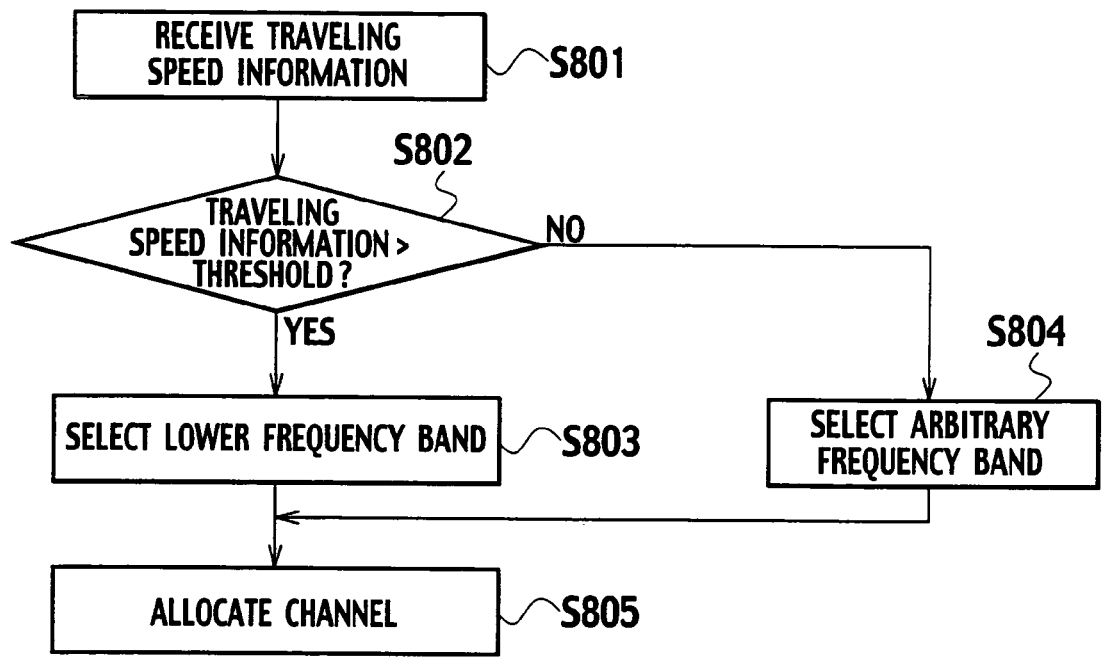
FIG. 12 is a flowchart showing a method of allowing the radio network controller to set up a communication channel when an incoming or outgoing call to and from the mobile station exists (No. 1).

FIG. 12 is a flowchart showing a method of allowing the radio network controller 300 to set up a communication channel when an outgoing call from the mobile station 100a or an incoming call to the mobile station 100a is initiated. Here, the communication quality is assumed to be the communication quality such as the degree of degradation of the channel estimation accuracy, which is deteriorated as the traveling speed of the mobile station becomes faster.

In Step S801, the communication unit 310 of the radio network controller 300 receives the traveling speed information from the communication unit 110 of the mobile station 100a. The traveling speed information is transmitted through a control channel which is set up when an incoming or outgoing call is initiated.

In Step S802, the comparison unit 320 compares the received traveling speed information with the threshold.

When the judgment is made in Step S802 that traveling speed information exceeds the threshold, in Step S803, the selector 340 selects a lower frequency band.

On the contrary, when the judgment is made in Step S802 that traveling speed information does not exceed the threshold, in Step S804, the selector 340 selects an arbitrary frequency band.

In Step S805, the allocation unit 350 allocates the channel belonging to the selected frequency band.

Figure 13:
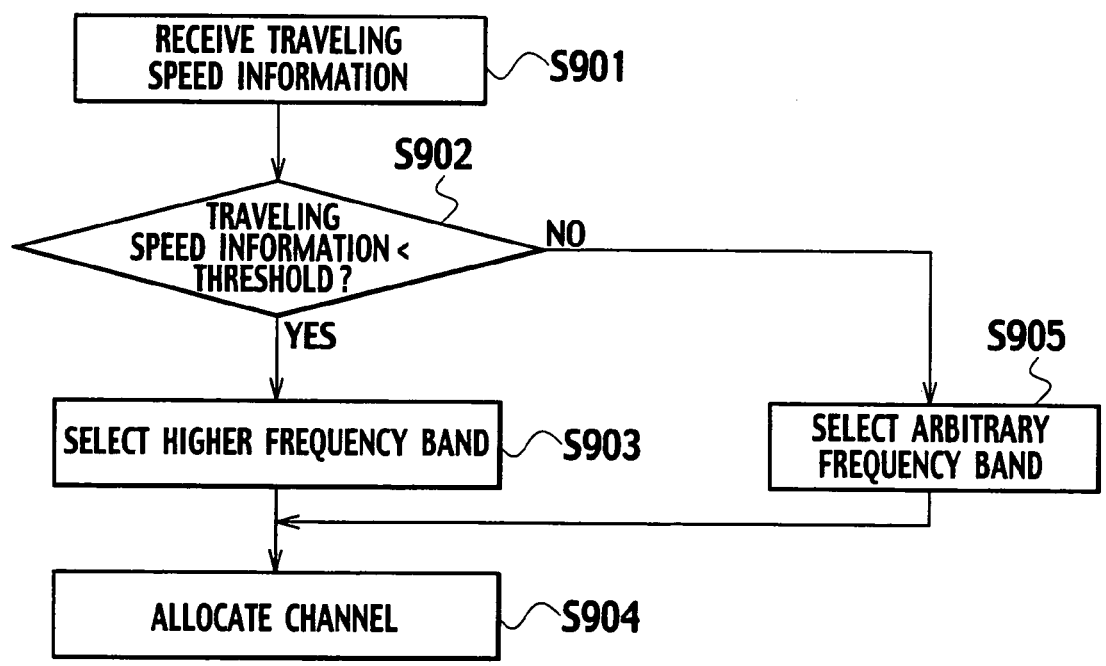
FIG. 13 is a flowchart showing the method of allowing the radio network controller to set up the communication channel when the incoming or outgoing call to and from the mobile station exists (No. 2).

FIG. 13 is a flowchart showing the method of allowing the radio network controller 300 to set up the communication channel when there is an outgoing call from the mobile station 100a or an incoming call to the mobile station 100a is initiated as similar to FIG. 12. However, in this case, the communication quality is assumed to be the communication quality such as the size of the interleave effect, which is deteriorated as the traveling speed of the mobile station becomes slower. In the following, the step of performing different processing from that in FIG. 12 will be described.

When the judgment is made in Step S902 that the traveling speed information falls below the threshold, in Step S903, the selector 340 selects a higher frequency band.

On the contrary, when the judgment is made in Step S902 that the traveling speed information does not fall below the threshold, in Step S905, the selector 340 selects an arbitrary frequency band.

Figure 14:
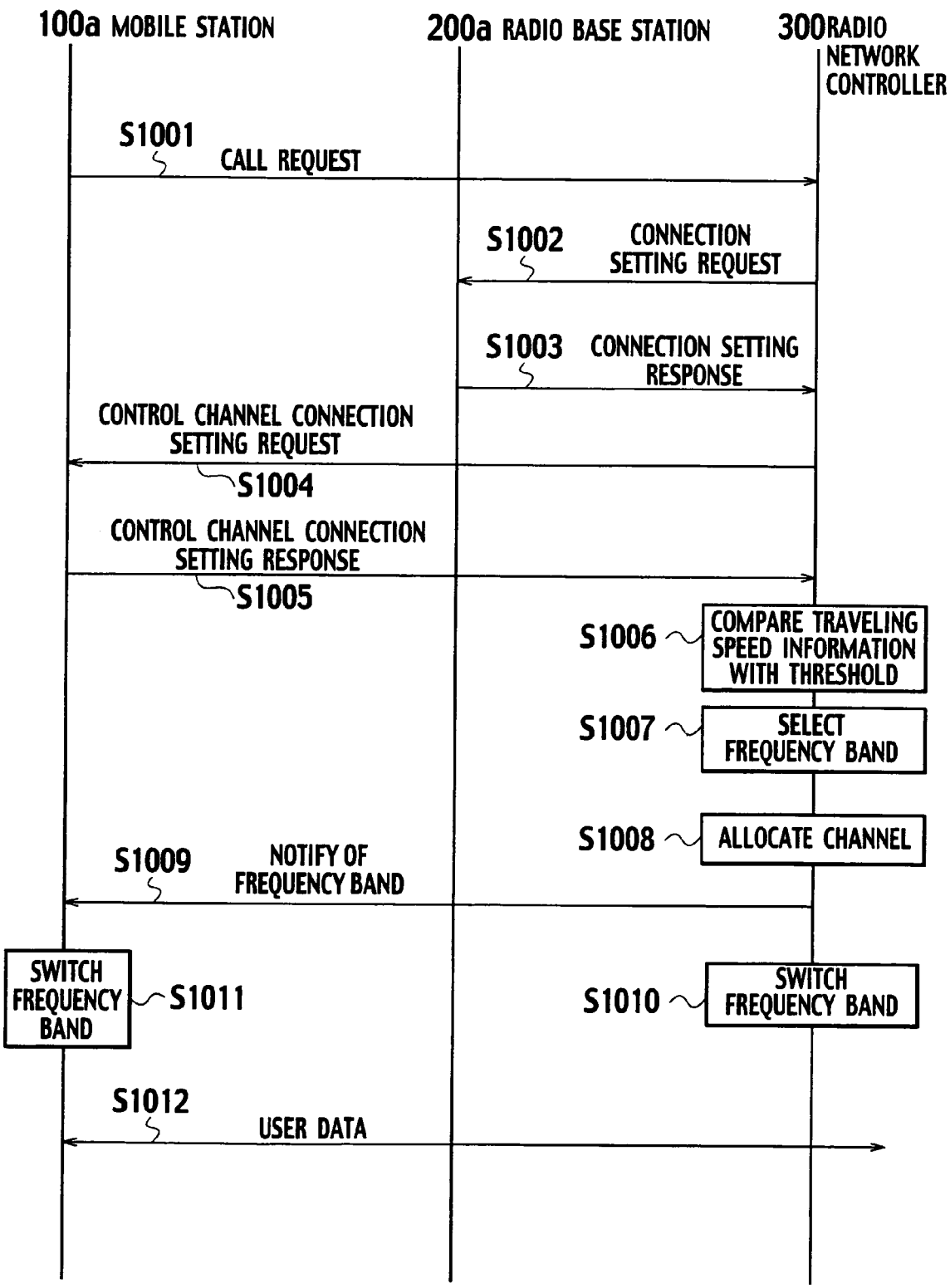
FIG. 14 is a sequence chart showing the method of allowing the radio network controller to set up the communication channel when there is the outgoing call from the mobile station.

FIG. 14 is a sequence chart showing the method of allowing the radio network controller 300 to set up the communication channel when the outgoing call from the mobile station 100a is initiated.

In Step S1001, the communication unit 110 of the mobile station 100a transmits a call request to the communication unit 310 of the radio network controller 300, and the communication unit 310 of the radio network controller 300 receives the call request.

In Step S1002, the communication unit 310 of the radio network controller 300 transmits a connection setting request to the radio base station 200a, and the communication unit 210 of the radio base station 200 receives the connection setting request.

In Step S1003, the communication unit 210 of the radio base station 200a transmits a connection setting response to the communication unit 310 of the radio network controller 300, and the communication unit 310 of the radio network controller 300 receives the connection setting response.

In Step S1004, the communication unit 310 of the radio network controller 300 transmits a control channel connection setting request to the communication unit 110 of the mobile station 100a, and the communication unit 110 of the mobile station 10a receives the control channel connection setting request.

In Step S1005, the communication unit 110 of the mobile station 100a transmits a control channel connection setting response to the communication unit 310 of the radio network controller 300, and the communication unit 310 of the radio network controller 300 receives the control channel connection setting response. The control channel connection setting response includes the traveling speed information.

In Step S1006, the comparison unit 320 of the radio network controller 300 compares the traveling speed information included in the control channel connection setting response with the threshold.

In Step S1007, the selector 340 selects the frequency band in response to a result of comparison in Step S1006.

In Step S1008, the allocation unit 350 allocates the channel belonging to the selected frequency band.

In Step S1009, the communication unit 310 of the radio network controller 300 transmits frequency band notification to the communication unit 110 of the mobile station 100a, and the communication unit 110 of the mobile station 10a receives the frequency band notification.

In Step S1010, the communication unit 310 of the radio network controller 300 switches the frequency band for the call.

In Step S1011, the communication unit 110 of the mobile station 100a switches the frequency band of the communication channel to the received frequency band.

In Step S1012, the communication unit 110 of the mobile station 100a transmits and receives user data through the allocated communication channel.

Figure 15:
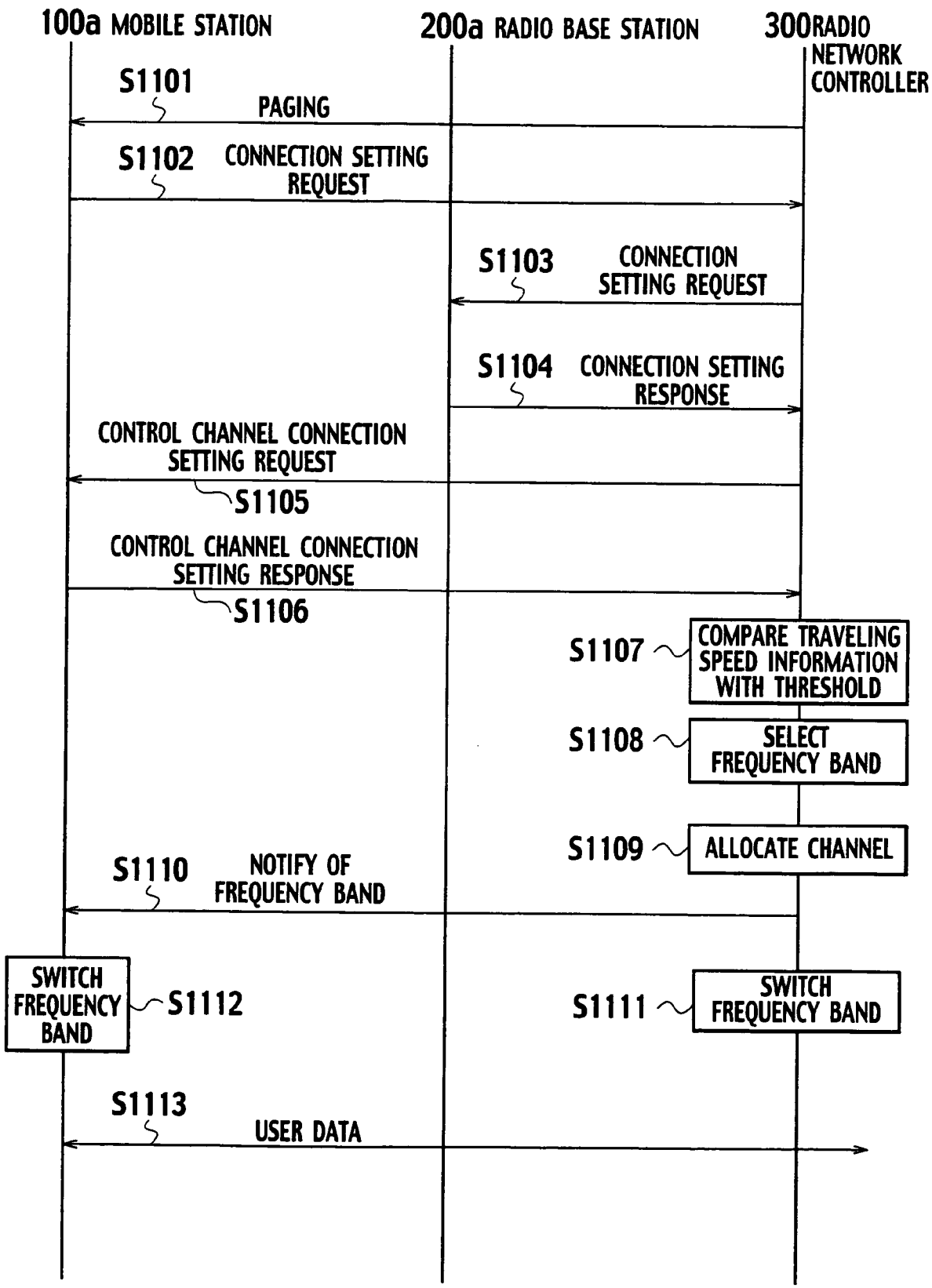
FIG. 15 is a sequence chart showing the method of allowing the radio network controller to set up the communication channel when an outgoing call request to the mobile station exists.

FIG. 15 is a sequence chart showing the method of allowing the radio network controller 300 to set up the communication channel when a call request to the mobile station 10a is initiated.

In Step S1101, the communication unit 110 of the mobile station 100a receives the paging transmitted by the communication unit 310 of the radio network controller 300.

In Step S1102, the communication unit 110 of the mobile station 100a transmits the connection setting request to the connection unit 310 of the radio network controller 300, and the connection unit 310 of the radio network controller 300 receives the connection setting request.

Steps S1103 to S1113 are similar to Steps S1002 to S1012 in FIG. 14. Accordingly, description will be omitted herein.

(Operations and Effects)

According to the mobile communication system and the mobile communication method according to the first embodiment, the comparison unit 130 or the comparison unit 320 compares the traveling speed information estimated by the estimator 120 with the threshold defined as the value of the traveling speed information for achieving the desired level of the communication quality which varies depending on the traveling speed. The selector 150 or the selector 340 selects the applicable frequency band based on the result of comparison by the comparison unit 130 or the comparison unit 320. Therefore, even when the mobile station is traveling at a speed which may degrade the communication quality, it is possible to improve the communication quality and to increase the radio capacity that can be accommodated.

The present invention is applicable to systems using various access modes such as the code division multiple access (CDMA), the orthogonal frequency division multiplexing (OFDM), the time division multiple access (TDMA) or the frequency division multiple access (FDMA).

Further, when the degree of degradation of the channel estimation accuracy is considered as the communication quality, the selector 150 or the selector 340 selects the applicable frequency band based on explicit criteria considering the degree of degradation of the channel estimation accuracy. Therefore, it is possible to suppress the influences of the fading variation and the frequency drift and to improve the channel estimation accuracy even when the mobile station 100a travels at a high traveling speed that may degrade the channel estimation accuracy.

Moreover, the channel estimation accuracy degrades due to the influences of the fading variation and the frequency drift, which become larger as the applicable frequency band is higher or as the traveling speed of the mobile station 100a is faster. Therefore, the selector 150 or the selector 340 is configured to select the lower frequency band when the traveling speed information exceeds the threshold. In this way, it is possible to suppress the influences of the fading variation and the frequency drift and to improve the channel estimation accuracy even when the mobile station 100a travels at a high speed.

Meanwhile, when the size of the interleave effect is considered as the communication quality, the selector 150 or the selector 340 selects the applicable frequency band based on explicit criteria considering the degree of degradation of the channel estimation accuracy. Therefore, it is possible to suppress the influence of the fading variation and to increase the interleave effect even when the mobile station 100a travels at a low traveling speed that may reduce the interleave effect.

In addition, the interleave effect reduces when the fading variation is slow. Moreover, the fading variation becomes slower as the applicable frequency band is lower or as the traveling speed of the mobile station 100a is slower. Therefore, the selector 150 or the selector 340 is configured to select the higher frequency band when the traveling speed information falls below the threshold. In this way, it is possible to suppress the influence of the fading variation and to increase the interleave effect even when the mobile station 100a travels at a slow speed.

Meanwhile, when the size of the user diversity effect of a shared channel is considered as the communication quality, the selector 150 or the selector 340 selects the applicable frequency band based on explicit criteria considering the size of the user diversity effect. Therefore, it is possible to suppress the influence of the fading variation and to increase the user diversity effect even when the mobile station 10a travels at a high traveling speed that may reduce the user diversity effect.

In addition, the user diversity effect of the shared channel reduces when the fading variation is fast. Further, the fading variation becomes faster as the applicable frequency band is higher or as the traveling speed of the mobile station 100a is faster. Therefore, the selector 150 or the selector 340 is configured to select the lower frequency band when the traveling speed information exceeds the threshold. In this way, it is possible to suppress the fading variation and to increase the user diversity even when the mobile station 100a travels at a high speed. Moreover, it is possible to increase the throughput which is one of factors of the user diversity effect.

Meanwhile, it is possible to improve radio communication quality by selecting the applicable frequency band considering the degree of degradation of the channel estimation accuracy, the size of the interleave effect, and the size of the user diversity effect of the shared channel. Accordingly, it is possible to suppress transmission power necessary for communication. Moreover, it is possible to increase the radio capacity by suppressing the transmission power necessary for communication.

Meanwhile, in the cell search to be performed in any of the event such as to turn on the power of the mobile station 100a, the event prior to soft handover, and the event in the standby state, the detector 170 detects the radio base station which can establish the radio link in the frequency band selected based on explicit criteria considering the desired communication quality. Accordingly, the radio link is established between the mobile station 100a and the radio base station 200a, in the frequency band selected based on the explicit criteria considering the desired communication quality. Therefore, even when the mobile station 100a travels at a traveling speed which may degrade the communication quality, it is possible to increase the radio capacity while improving the communication quality.

In addition, the allocation unit 350 allocates the channel belonging to the frequency band selected by the selector 150 or the selector 340 when the mobile station 100a transmits or receives a call. Accordingly, the channel belonging to the frequency band selected based on the explicit criteria considering the desired communication quality is allocated to an outgoing or incoming call. Therefore, even when the mobile station 10a travels at a traveling speed which may degrade the communication quality, it is possible to increase the radio capacity while improving the communication quality.

Further, the estimator 120 is configured to estimate the traveling speed information using either the channel estimation value or the position information detected by the GPS. Accordingly, the traveling speed information is estimated based on a signal which has been transmitted or received by a conventional mobile communication system.

In addition, the traveling speed information is measured by the mobile station 100a. Accordingly, the mobile station can select the appropriate frequency band autonomously, and it is thereby possible to reduce a load on the network. Further, the notification unit 160 notifies the radio base station 200a of at least any one of the traveling speed information, the result of comparison, and the selected frequency band. In this way, the traveling speed information and other information can be transmitted to the radio network controller 300 through the radio base station 200a. Therefore, it is possible to cause the radio network controller 300 to select the appropriate frequency band.

2. Second Embodiment (Mobile Communication System)

Figure 16:
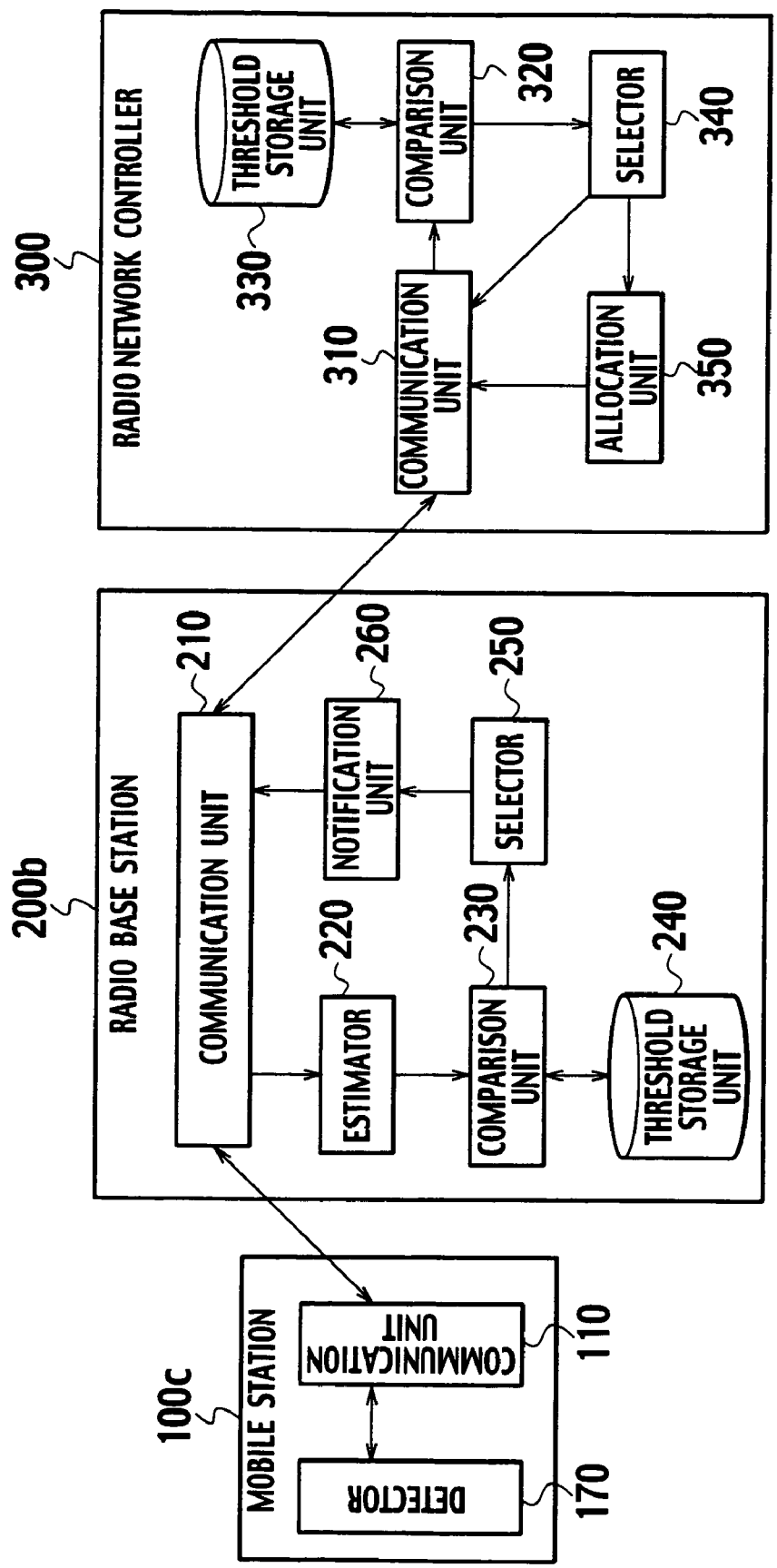
FIG. 16 is a block diagram showing configurations of respective constituents of a mobile communication system according to the second embodiment.

Configurations of respective constituents of the mobile communication system 1 according to the second embodiment will be described in detail with reference to FIG. 16. The portions acting as similar functions to those in the first embodiment are designated by the same reference numerals, and description thereof will be omitted.

In the second embodiment, an estimator, a comparison unit, a threshold storage unit, a selector, and a notification unit are installed in a radio base station 200b instead of a mobile station 100c.

The mobile station 100c includes a communication unit 110 and a detector 170.

The radio base station 200b includes a communication unit 210, an estimator 220, a comparison unit 230, a threshold storage unit 240, a selector 250, and a notification unit 260.

The estimator 220 estimates traveling speed information, which is a value variable either with a traveling speed or with an increase and a decrease in the traveling speed. The estimator 220 can estimate the traveling speed information as similar to the estimator 120 in the first embodiment. For example, the estimator 220 obtains an inverse number of a time correlation value of a channel estimation value by performing calculation of the formula (2) based on a received signal from the communication unit 110 of the mobile station 100c.

As similar to the comparison unit 130 in the first embodiment, the comparison unit 230 acquires the traveling speed information estimated by the estimator 220 from the estimator 220, and compares a threshold which is stored in the threshold storage unit 240 to be described later with the traveling speed information estimated by the estimator 220.

As similar to the threshold storage unit 140 in the first embodiment, the threshold storage unit 240 stores the threshold which is determined in response to communication quality to be considered.

The selector 250 selects a frequency band to be used for communication between the mobile station 100c and the radio base station 200b in response to an acquired result of comparison, as similar to the selector 150 in the first embodiment. Here, the selector 250 acquires the result of comparison between the threshold and the traveling speed information from the comparison unit 230.

The notification unit 260 is a first notification unit configured to notify a radio network controller 300 of any one of the traveling speed information estimated by the estimator 220, the result of comparison by the comparison unit 230, and the frequency band selected by the selector 250 through the communication unit 210. Here, the notification unit 260 acquires the traveling speed information from the estimator 220 through the comparison unit 230 and the selector 250, acquires the result of comparison from the comparison unit 230 through the selector 250, and acquires the selected frequency band from the selector 250.

(Mobile Communication Method)

Next, a mobile communication method according to the second embodiment will be described. The mobile communication method according to the second embodiment is carried out as similar to the mobile communication method of the first embodiment which are illustrated in FIGS. 5 to 15.

However, since the mobile station 100c is not configured to estimate the traveling speed information, the mobile station 100c cannot estimate the traveling speed information and perform the cell search as shown in FIGS. 5 to 8. Nevertheless, the mobile station 100c can perform the cell search if the mobile station 100c can receive notification of the traveling speed information from the radio base station 200b.

Moreover, when the radio network controller 300 selects the frequency band as shown in FIG. 9 to FIG. 15, the radio network controller 300 acquires the traveling speed information from the radio base station 200b.

(Operations and Effects)

According to the mobile communication system and the mobile communication method according to the second embodiment, it is possible to obtain similar effects which are similar to the effects achieved by the mobile station 100a, the radio base station 200a, and the radio network controller 300 in the first embodiment.

However, the radio base station 200b estimates the traveling speed information instead of the mobile station 100c, and notifies the radio network controller 300 of the traveling speed information. In this way, the radio network controller 300 can select the appropriate frequency band.

Moreover, unlike the first embodiment, the frequency band is selected on the network side instead of the mobile station. Accordingly, it is possible to judge in a comprehensive manner upon selection of the frequency band while considering other factors than the traveling speed.

Other Embodiments

Although the present invention has been described with reference to certain embodiments, it is to be noted that the descriptions and the drawings constituting part of this disclosure does not limit the scope of the present invention. It is obvious to those skilled in the art that various modified embodiments, examples, and technical applications are possible from the teachings of this disclosure.

For example, in Step S112 in FIG. 5 or in Step S212 in FIG. 6, the selector 150 is configured to select an arbitrary frequency band when the judgment is made that the traveling speed information does not exceed (or fall below) the threshold. In this case, the selector 150 is configured as described above because the communication quality does not seem to fall below the desired level. Instead, the selector 150 may be configured to select the higher frequency band in Step S112 or to select the lower frequency band in Step S212. Moreover, similarly in the method illustrated in FIGS. 7 to 15, it is possible to select the frequency band which may degrade the communication quality when a judgment is made that the communication quality will not fall below the desired level.

In this way, it is possible to reserve the frequency band to be allocated when the communication quality actually falls below the desired level.

Moreover, in this case, it is also possible to define two thresholds and to configure the selector 150 to select an arbitrary frequency band, or not to switch the frequency band when the traveling speed information has a value between the two thresholds.

In this way, it is possible to suppress a frequency of switching the frequency band.

Meanwhile, each of the threshold storage units 140, 240, and 330 may be configured to store the three thresholds, namely, the threshold considering the degree of degradation of the channel estimation accuracy, the threshold considering the size of the interleave effect, and the threshold considering the size of the user diversity effect of the shared channel. In this case, each of the selectors 150, 250, and 340 may be configured to determine priority of the frequency band to be selected, in response to the result of comparison between the traveling speed information and each of the thresholds.

In this way, it is possible to select the applicable frequency band while considering the above-described three factors as the communication quality.

Moreover, the estimator 120 and the estimator 220 can be configured to estimate the traveling speed information using channel estimation value or position information detected by a global positioning system (GPS).

In this case, the estimator 120 or the estimator 220 estimates the traveling speed information using either the channel estimation value or the position information detected by the GPS. Accordingly, the traveling speed information is estimated based on a signal which has been transmitted or received even in a conventional mobile communication system.

What is claimed is:

1. A mobile communication system configured to allow a mobile station and a radio base station to execute communication using a specific frequency band, the mobile communication system comprising:

an estimator configured to estimate traveling speed information which is a value variable with a traveling speed of the mobile station or a variation in the traveling speed;

a comparison unit configured to compare the traveling speed information estimated by the estimator with a threshold defined as a value of traveling speed information for achieving a desired level of communication quality which varies depending on the traveling speed; and a selector configured to select a frequency band to be used for communication between the mobile station and the radio base station in response to a result of comparison by the comparison unit, wherein the communication quality is defined as a degree of degradation of channel estimation accuracy, and the selector is configured to select a lower frequency band when the traveling speed information exceeds the threshold.

2. A mobile communication system configured to allow a mobile station and a radio base station to execute communication using a specific frequency band, the mobile communication system comprising:

an estimator configured to estimate traveling speed information which is a value variable with a traveling speed of the mobile station or a variation in the traveling speed;

a comparison unit configured to compare the traveling speed information estimated by the estimator with a threshold defined as a value of traveling speed information for achieving a desired level of communication quality which varies depending on the traveling speed; and a selector configured to select a frequency band to be used for communication between the mobile station and the radio base station in response to a result of comparison by the comparison unit, wherein the communication quality is defined as a size of an interleave effect, and the selector is configured to select a higher frequency band when the traveling speed information falls below the threshold.

3. A mobile communication system configured to allow a mobile station and a radio base station to execute communication using a specific frequency band, the mobile communication system comprising:

an estimator configured to estimate traveling speed information which is a value variable with a traveling speed of the mobile station or a variation in the traveling speed;

a comparison unit configured to compare the traveling speed information estimated by the estimator with a threshold defined as a value of traveling speed information for achieving a desired level of communication quality which varies depending on the traveling speed; and a selector configured to select a frequency band to be used for communication between the mobile station and the radio base station in response to a result of comparison by the comparison unit, wherein the communication quality is defined as a size of a user diversity effect of a shared channel, and the selector is configured to select a lower frequency band when the traveling speed information exceeds the threshold.

4. A mobile communication system configured to allow a mobile station and a radio base station to execute communication using a specific frequency band, the mobile communication system comprising:

an estimator configured to estimate traveling speed information which is a value variable with a traveling speed of the mobile station or a variation in the traveling speed;

a comparison unit configured to compare the traveling speed information estimated by the estimator with a threshold defined as a value of traveling speed information for achieving a desired level of communication quality which varies depending on the traveling speed;

a selector configured to select a frequency band to be used for communication between the mobile station and the radio base station in response to a result of comparison by the comparison unit; and a detector configured to select a radio base station capable of establishing a radio link using the frequency band selected by the selector, at the time of a cell search for detecting the radio base station supposed to establish the radio link.

5. A mobile communication system configured to allow a mobile station and a radio base station to execute communication using a specific frequency band, the mobile communication system comprising:

an estimator configured to estimate traveling speed information which is a value variable with a traveling speed of the mobile station or a variation in the traveling speed;

a comparison unit configured to compare the traveling speed information estimated by the estimator with a threshold defined as a value of traveling speed information for achieving a desired level of communication quality which varies depending on the traveling speed;

a selector configured to select a frequency band to be used for communication between the mobile station and the radio base station in response to a result of comparison by the comparison unit; and a notification unit configured to notify a radio network controller for controlling the radio base station of at least any one of the traveling speed information, the result of comparison, and the selected frequency band, wherein the estimator and the notification unit are installed in the radio base station.

6. A mobile communication system configured to allow a mobile station and a radio base station to execute communication using a specific frequency band, the mobile communication system comprising:

an estimator configured to estimate traveling speed information which is a value variable with a traveling speed of the mobile station or a variation in the traveling speed;

a comparison unit configured to compare the traveling speed information estimated by the estimator with a threshold defined as a value of traveling speed information for achieving a desired level of communication quality which varies depending on the traveling speed;

a selector configured to select a frequency band to be used for communication between the mobile station and the radio base station in response to a result of comparison by the comparison unit; and a notification unit configured to notify the radio base station of at least any one of the traveling speed information, the result of comparison, and the selected frequency band, wherein the estimator and the notification unit are installed in the mobile station.

* * * * *